(12) United States Patent
Dillon et al.

(10) Patent No.: US 6,490,825 B1
(45) Date of Patent: Dec. 10, 2002

(54) FLEXIBLE TRELLIS AND METHOD OF USING THE SAME

(76) Inventors: Stephen F. Dillon, 4534 Canyon Crest Dr., City of League, TX (US) 77573; Cindy L. Dillon, 4534 Canyon Crest Dr., City of League, TX (US) 77573

( * ) Notice: Subject to any disclaimer, the term of this patent is extended or adjusted under 35 U.S.C. 154(b) by 0 days.

(21) Appl. No.: 09/894,154

(22) Filed: Jun. 27, 2001

Related U.S. Application Data
(60) Provisional application No. 60/214,708, filed on Jun. 27, 2000.

(51) Int. Cl.$^7$ .............................................. A01G 17/06
(52) U.S. Cl. .............................................. 47/47; 47/44
(58) Field of Search ................. D25/38, 100; D08/323; 16/221, 254; 256/26, 12.5, 32, 33, 37, 46; 47/44, 45, 47

(56) References Cited

U.S. PATENT DOCUMENTS

| | | | | |
|---|---|---|---|---|
| 30,021 A | * | 9/1860 | Burrows | |
| 2,458,931 A | * | 1/1949 | Conklin | 47/44 |
| 2,581,318 A | * | 1/1952 | Bartlett | 119/20 |
| 3,014,700 A | * | 12/1961 | May, Jr. | 256/33 |
| 3,264,783 A | * | 8/1966 | Bayliss | 47/45 |
| 3,651,851 A | * | 3/1972 | Curtis | 160/135 |
| 3,793,771 A | * | 2/1974 | Slaughter | 47/44 |
| 4,130,272 A | * | 12/1978 | Emmie | 256/22 |
| 5,323,559 A | * | 6/1994 | Allman | 47/45 |
| 5,544,446 A | * | 8/1996 | Benson, Jr. | 47/45 |
| 5,647,166 A | * | 7/1997 | Neff | 47/45 |
| 6,237,282 B1 | * | 5/2001 | Pitts | 47/46 |

* cited by examiner

Primary Examiner—Charles T. Jordan
Assistant Examiner—Bret Hayes
(74) Attorney, Agent, or Firm—Marshall, Gerstein & Borun

(57) ABSTRACT

A flexible trellis and method of forming and using the same is disclosed. The flexible trellis includes a first primary section and a second primary section. Each of the first and second primary sections includes a first upright, a second upright, and a plurality of vertically spaced cross members joined to the first upright and the second upright and maintaining the first and second uprights in spaced apart relationship. A plurality of vertically spaced hinge members are provided. Each of the hinge members includes a first end and a second end, with the first end pivotally connected to the first primary section and the second end pivotally connected to the second primary section. The hinge members are arranged to permit pivotal movement of the first primary section relative to the second primary section about a pair of spaced apart vertical axes. Additional and substantially identical primary sections may be provided as desired.

9 Claims, 3 Drawing Sheets

FLEXIBLE TRELLIS AND METHOD OF USING THE SAME

RELATED APPLICATIONS

This application claims priority from earlier U.S. Provisional Application Ser. No. 60/214,708, filed Jun. 27, 2000.

FIELD OF THE INVENTION

The present invention relates generally to trellises, and more specifically, to a flexible trellis having one or more decorative and/or functional applications.

BACKGROUND OF THE INVENTION

It is well known that many homeowner's spend a great deal of time, money, and effort in an ongoing attempt to increase the beauty, and hence the value, of their homes. Much of this effort is focused on enhancing the beauty of the property surrounding a home rather than on the structure of the home itself. Such attempts at beautification are, by their nature, a very personal and creative endeavor. Thus, homeowner's are constantly searching for additional ways to satisfy this creative outlet.

Trellises are generally known in the art. In some applications, a trellis is often used as a decorative accessory in order to complement the home decor. In other applications, a trellis may be used to support flowers or other plants, such as vines or ivy. In still other applications, a trellis may be used to camouflage unsightly utility poles, transformers, junction boxes, etc. However, conventional trellises are limited in their applications.

DETAILED DESCRIPTION OF THE DISCLOSED EMBODIMENT

The following description of the disclosed embodiment is not intended to limit the scope of the invention to the precise form or forms detailed herein. Instead, the following description is intended to be illustrative of the principles of the invention so that others may follow its teachings.

Figure 1:
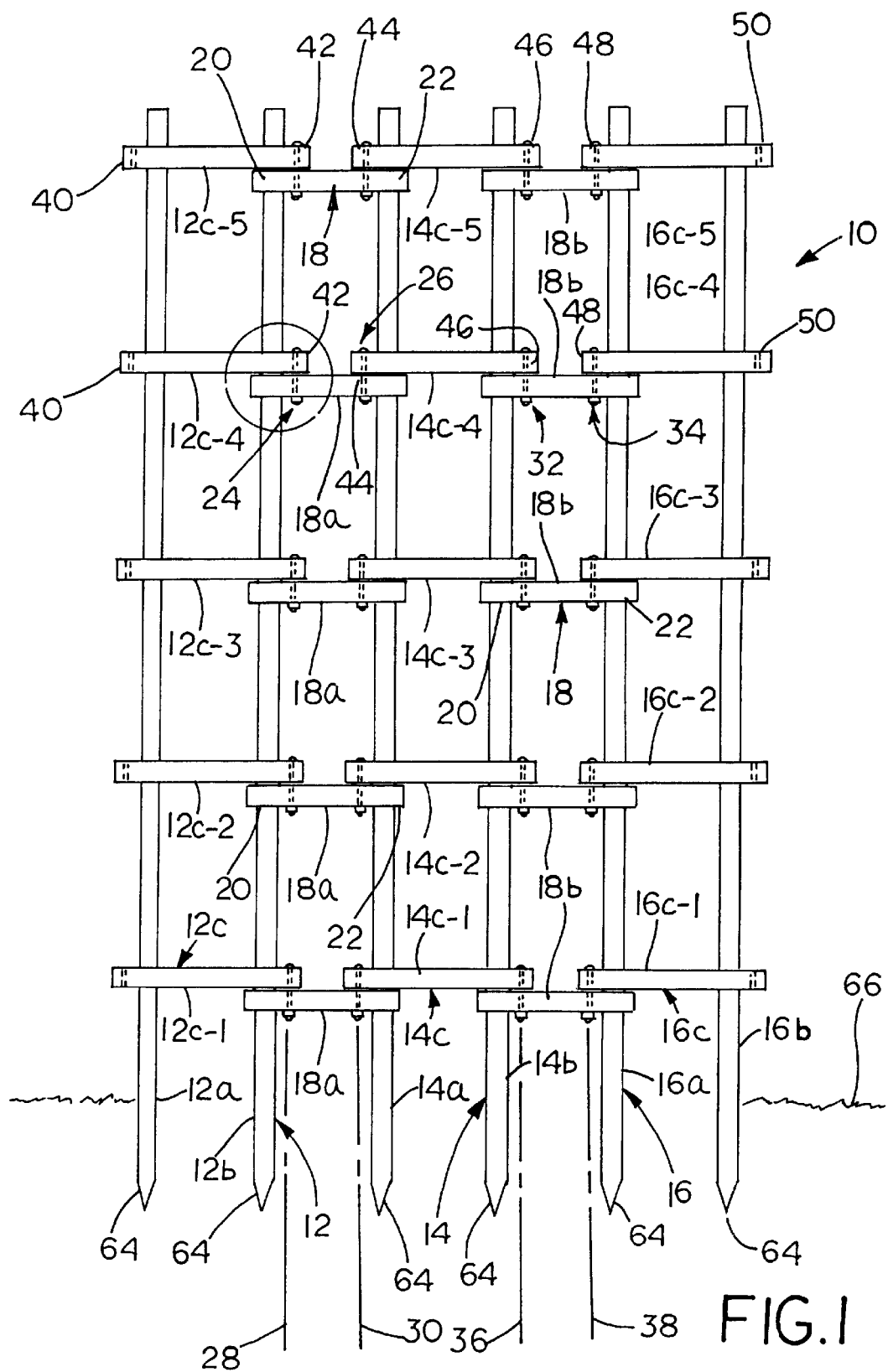
FIG. 1 is a front elevational view of a flexible trellis assembled in accordance with the teachings of the present invention.
Figure 2:
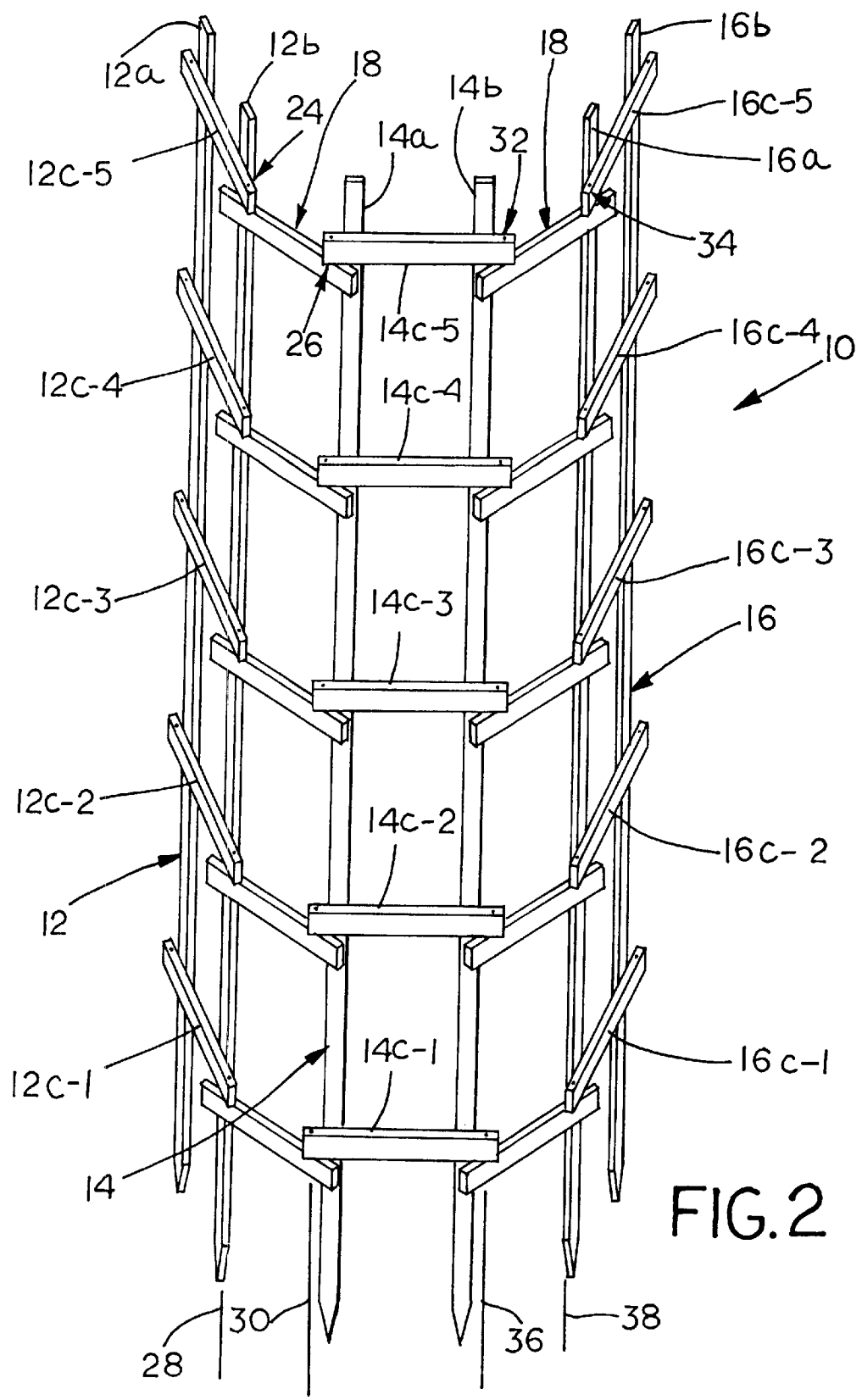
FIG. 2 is a perspective view of the flexible trellis illustrated in FIG. 1.

Referring now to FIGS. 1 and 2 of the drawings, a flexible trellis assembled in accordance with the teachings of the present invention is shown therein and is generally referred to by the reference numeral 10. As shown, the flexible trellis 10 includes three sections 12, 14, and 16. It will be understood that the sections 12, 14 and 16 are substantially identical. It will also be understood that the flexible trellis 10 may include additional sections (not shown). As another alternative, the flexible trellis 10 may include as few as two sections (e.g., 12 and 14 only).

The section 12 includes a pair of uprights 12a and 12b, which are interconnected in spaced apart and generally parallel relationship by a plurality of vertically spaced cross members 12c, including the cross members 12c-1 through 12c-5. Additional or fewer cross members 12c may be used. Similarly, the section 14 includes a pair of uprights 14a and 14b, which are interconnected in spaced apart and generally parallel relationship by a plurality of vertically spaced cross members 14c, including the cross members 14c-1 through 14c-5. Finally, the section 16 includes a pair of uprights 16a and 16b, which are interconnected in spaced apart and generally parallel relationship by a plurality of vertically spaced cross members 16c, including the cross members 16c-1 through 16c-5.

A plurality of hinge members 18 are provided. Each hinge member 18 includes a first end 20 and a second end 22. As shown, a number of hinge members 18 connect the section 12 to the section 14, while a number of hinge members 18 connect the section 16 to the section 14. More specifically, a plurality of hinge members 18a connect the section 12 to the section 14, while a plurality of hinge members 18b connect the section 16 to the section 14. All of the hinge members 18a, 18b are preferably identical for ease of manufacture. The number of hinge members 18 will preferably correspond to the number of cross members on the adjacent sections 12, 14 and 16.

The first end 20 of each hinge member 18a is pivotally connected to the section 12 by a plurality of pivots 24, while the second end 22 of each hinge member 18a is pivotally connected to the section 14 by a plurality of pivots 26. The pivots 24 are aligned along a vertical axis 28, while the pivots 26 are aligned along a vertical axis 30. The axes 28 and 30 are spaced apart and generally parallel to each other.

Similarly, the first end 20 of each hinge member 18b is pivotally connected to the section 14 by a plurality of pivots 32, while the second end 22 of each hinge member 18b is pivotally connected to the section 16 by a plurality of pivots 34. The pivots 32 are aligned along a vertical axis 36, while the pivots 34 are aligned along a vertical axis 38. The axes 36 and 38 are spaced apart and generally parallel to each other, and are also generally parallel to the axes 28 and 30.

Each cross member 12c includes a pair of tabs 40, 42, which extend past the uprights 12a, 12b, respectively. Similarly, each cross member 14c includes a pair of tabs 44, 46, which extend past the uprights 14a, 14b, respectively, while each cross member 16c includes a pair of tabs 48, 50, which extend past the uprights 16a, 16b, respectively. Note that the tab 40 may be omitted if no additional section (not shown) is attached to the section 12, and the tab 50 may be omitted if no additional section (not shown) is attached to the section 16. However, it will be noted that the inclusion of these tabs 40, 50 will permit the attachment of additional sections (not shown) in modular fashion at any point in time.

Figure 4:
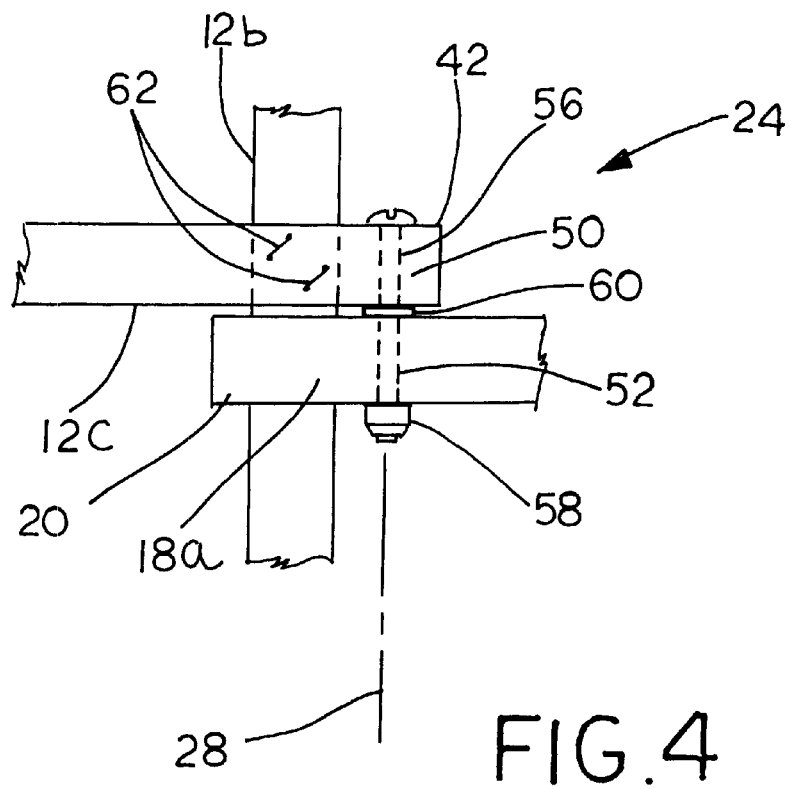
FIG. 4 is an enlarged fragmentary view taken about the circumscribed portion of FIG. 1 and illustrating an exemplary pivotal connection between one of the primary sections and one of the hinge members.

Referring now to FIG. 4, the pivot 24 is shown therein. It will be understood that the construction and operation of the pivots 26, 32 and 34 is substantially identical the construction and operation of the pivot 24. For the sake of brevity, only the construction and operation of the pivot 24 will be described in detail herein. The tab 42 of the cross member 12c includes an aperture 50, while the end 20 of the hinge member 18a includes an aperture 52. Both of the apertures 50, 52 are aligned with the vertical axis 28, and are joined with a fastener 56. Preferably, the fastener 56 is a stainless steel machine screw, and is secured with a nut 58, which is preferably a locking nut. Still preferably, a flat washer 60 is provided between the end 20 of the hinge member 18a and the tab 40 of the cross member 12c. It will be understood that the pivots 26, 32 and 34 will be provided with appropriate apertures in alignment with the respective axes 30, 36 and 38.

Referring still to FIG. 4, the cross member 12c is preferably joined to the upright 12b using a plurality of mechanical fasteners 62, such as, for example, zinc coated, 18 gauge staples of suitable length. Other suitable fasteners may be employed. Further, the cross member 12c is preferably also glued to the upright 12b using a suitable wood adhesive which is commercially available from a variety of sources. The details of joining the cross member 12c to the upright 12b is exemplary. All of the cross members 12c, 14c, 16c may be joined to their respective uprights 12a, 12b, 14a, 14b, 16a and 16b using the same or similar detail.

At least some of or all of the uprights 12a, 12b, 14a, 14b, 16a and 16b may be provided with a point 64. The points 64 will permit the flexible trellis 10 to be secured in an upright position with the points 64 on the lower portions of the uprights 12a, 12b, 14a, 14b, 16a and 16b inserted into a support surface such as the ground 66.

It will be appreciated that, in accordance with the disclosed embodiment, each of the sections 12, 14 and 16 may be substantially identical, and thus may be easily mass produced. The sections may be joined to any number of additional sections in modular fashion as desired. Each of the cross members 12c, 14c, and 16c, are substantially identical, and each of the hinge members are substantially identical. Again, these features lend themselves to mass production and modular assembly, which lowers production and assembly costs and which facilitates ease of assembly by the end user. The uprights 12a and 12b, as well as the cross members 12c and the hinge members 18 are preferably made of wood. Other suitable materials maybe chosen.

In accordance with the disclosed embodiment, the flexible trellis 10 may be assembled using clear Douglas Fir, a very strong wood that is favored for its longevity when used in outdoor applications. Further, stainless steel machine screws are preferably employed in order to secure the sections together. The screws are preferably secured using locking nuts in order to ensure smooth flexible operation. The flexible trellis 10 is further preferably painted with a high quality enamel or treated with a suitable wood protector, all of which are readily commercially available from a variety of sources. Ideally, suitable treatments will provide water proofing, mildew prevention, color protection, prevent wood-rot, and provide UV protection, in order to maximize the life span of the flexible trellis 10.

When assembled and employed in accordance with the teachings of the disclosed embodiment, the flexible trellis 10 may enhance the beauty of any lawn or garden. The flexible trellis 10 may be used to complement the decor of the home, or alternatively, may be used to camouflage objects or items that the user may wish to partially or totally obscure or screen from view. The flexible trellis can support climbing plants that may offer additional beautification and decorative advantages.

Figure 3:
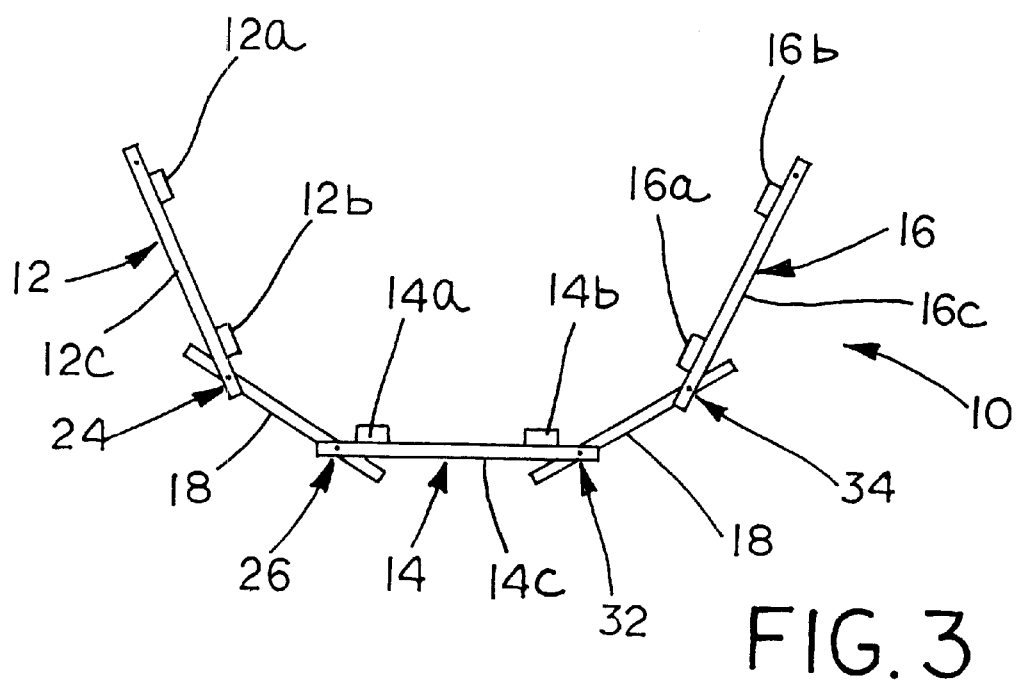
FIG. 3 is a top plan view thereof.

Further, the flexible trellis 10 is readily moved to different locations as the user may desire. The flexible trellis may be used, for example, around poles, mailboxes, or to hide "unsightly" transformers or other water, electrical, or gas utility devices. A number of similar or identical trellises 10 may be linked together to form a contoured wall by pivoting the sections in different directions (for example, referring to the plan view of FIG. 3, rotating some of the sections in a clockwise direction while rotating other of the sections in a counterclockwise direction).

Those skilled in the art will appreciate that, although the teachings of the invention have been illustrated in connection with certain embodiments, there is no intent to limit the scope of this patent to such embodiments. On the contrary, the intention of this patent is to cover all modifications and embodiments fairly falling within the scope of the appended claims either literally or under the doctrine of equivalents.

What is claimed:

1. A flexible trellis, comprising:
   a first primary section and a second primary section, each of the first and second primary sections including a first upright, a second upright, and a plurality of vertically spaced rigid cross members joined to the first upright and the second upright and maintaining the first and second uprights in spaced apart relationship, each of the cross members having an extended end;
   a plurality of vertically spaced hinge members, each of the hinge members having a first end and a second end, the first end of each of the hinge members forming a first tab, the first tab of the hinge members pivotally connected to the extended ends of the first primary section using vertically oriented fasteners disposed along a first vertical axis, the second end of each of the hinge members forming a second tab, the second tab of the hinge members pivotally connected to the extended ends of the second primary section using vertically oriented fasteners disposed along a second vertical axis, the hinge members arranged to permit pivotal movement of the first primary section relative to the second primary section about the first and second vertical axes.

2. The flexible trellis of claim 1, wherein the cross members of the second primary section includes a second extended end, and further including a third primary section, the third primary section including a first upright, a second upright, and a plurality of vertically spaced rigid cross members joined to the first upright and the second upright and maintaining the first and second uprights in spaced apart relationship, each of the cross members of the third primary section having an extended end, and a plurality of vertically spaced hinge members connecting the second and third primary sections, each of the hinge members having a first end and a second end, the first end of each of the hinge members of the third primary section forming a third tab, the third tabs pivotally connected to the second extended end of the second primary section using vertically oriented fasteners disposed along a third vertical axis, and the second end of each of the hinge members of the third primary section forming a fourth tab, the fourth tabs pivotally connected to the third primary section using vertically oriented fasteners disposed along a fourth vertical axis, the hinge members arranged to permit pivotal movement of the third primary section relative to the second primary section about the third and fourth vertical axes.

3. A modular flexible trellis, comprising:
   a plurality of sections, each of the sections including a first upright, a second upright, and a plurality of vertically spaced cross members joined to the first upright using at least a pair of spaced mechanical fasteners and joined to the second upright using at least a pair of spaced mechanical fasteners, the cross members maintaining the first and second uprights in spaced apart and generally parallel relationship, each of the cross members of each of the sections having at least one extended end; and
   a plurality of vertically spaced hinge members, each of the hinge members having a first end and a second end, the first end of each of the hinge members forming a first tab and the second end of each of the hinge members forming a second tab, the first tab of each of the hinge members pivotally joining the first end of the hinge members to the extended end of a first one of the plurality of sections using a vertically oriented fastener, the second tab of each of the hinge members pivotally joining the second end of the hinge members to the extended end of a second one of the plurality of sections using a second vertically oriented fastener;

whereby each of the sections is pivotal relative to its adjacent section about a pair of spaced apart vertical axes, each of the pair of vertical axes spaced away from the closest adjacent upright.

4. The flexible trellis of claim 3, wherein at least some of the uprights are adapted for securement to a supporting surface.

5. The flexible trellis of claim 3, wherein each of the vertically oriented fasteners are disposed through a pair of aligned apertures.

6. A method of forming a modular flexible trellis, comprising the steps of:

providing a plurality of sections, each of the sections including a first upright, a second upright, and a plurality of vertically spaced cross members joined to the first upright and the second upright using a pair of spaced apart horizontally disposed mechanical fasteners, the cross members maintaining the first and second uprights in spaced apart and generally parallel relationship;

providing at least one extended end on at least some of the cross members;

providing a plurality of vertically spaced hinge members, each of the hinge members having a first tab and a second tab;

connecting each of the sections to an adjacent one of the sections by connecting the tabs of the hinge members to the extended ends of the cross members using vertically oriented fasteners disposed through a pair of vertically aligned holes; and selectively pivoting each of the sections relative to its adjacent section about at least one of a pair of spaced apart vertical axes.

7. The method of claim 6, including the step of securing each of the cross members to the uprights using threaded fasteners and adhesives.

8. The method of claim 6, including the additional steps of:

forming a point in a lower end of each of the uprights; and
inserting the points into a support surface.

9. The method of claim 6, including the steps of providing an object; and at least partially wrapping the flexible trellis around the object by selectively pivoting each of the sections about the vertical axes, whereby the object is at least partially substantially obscured from the view of a user.

* * * * *